United States Patent
Hatch et al.

(10) Patent No.: US 8,459,654 B2
(45) Date of Patent: Jun. 11, 2013

(54) HYDRODYNAMIC SEAL WITH INCREASED FLEXIBILITY SEALING ELEMENT

(75) Inventors: Frederick R. Hatch, Ann Arbor, MI (US); David M. Toth, Brighton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 161 days.

(21) Appl. No.: 13/099,474

(22) Filed: May 3, 2011

(65) Prior Publication Data
US 2012/0280457 A1  Nov. 8, 2012

(51) Int. Cl.
*F16J 15/32* (2006.01)
*F16J 15/34* (2006.01)

(52) U.S. Cl.
USPC .......................... 277/559; 277/402

(58) Field of Classification Search
CPC .............................. F16J 15/3244; F16J 15/3256
USPC .......................... 277/559, 569, 402
See application file for complete search history.

(56) References Cited

U.S. PATENT DOCUMENTS

| | | | |
|---|---|---|---|
| 3,984,113 A | 10/1976 | Bentley | |
| 4,739,998 A | 4/1988 | Steusloff et al. | |
| 4,844,484 A * | 7/1989 | Antonini et al. | 277/561 |
| 5,615,894 A * | 4/1997 | vom Schemm | 277/559 |
| 6,168,164 B1 | 1/2001 | Toth et al. | |
| 6,336,638 B1 | 1/2002 | Guth et al. | |
| 6,620,361 B1 | 9/2003 | Longtin et al. | |
| 6,715,768 B1 | 4/2004 | Bock et al. | |
| 6,779,798 B1 | 8/2004 | Fougerolle | |
| 7,040,628 B2 | 5/2006 | Boyers | |
| 7,100,924 B2 | 9/2006 | Toth et al. | |
| 7,464,942 B2 * | 12/2008 | Madigan | 277/569 |
| 7,494,130 B2 | 2/2009 | Berdichevsky | |
| 2001/0030398 A1 * | 10/2001 | Hosokawa et al. | 277/549 |
| 2002/0063393 A1 * | 5/2002 | Sassi | 277/551 |
| 2005/0098959 A1 | 5/2005 | Uhrner | |
| 2006/0012128 A1 * | 1/2006 | Lutaud | 277/559 |
| 2007/0057472 A1 * | 3/2007 | Hatch | 277/569 |
| 2011/0316238 A1 | 12/2011 | Schmitt | |

OTHER PUBLICATIONS

International Search Report PCT/US2012/035955 mailed on Aug. 27, 2012.

* cited by examiner

*Primary Examiner* — Vishal Patel
*Assistant Examiner* — Nathan Cumar
(74) *Attorney, Agent, or Firm* — Robert L. Stearns; Dickinson Wright, PLLC (57) ABSTRACT

A hydrodynamic shaft seal assembly includes a PTFE seal member having outer and inner sections. The outer section is affixed to an annular carrier. The inner section is free and includes at least one hydrodynamic groove in direct running contact with a rotating shaft or wear sleeve. A mid-portion of the seal member is formed between the inner and outer sections. The mid-portion is thinned and includes one or more annular undulations formed therein to improve flexibility of the inner section relative to the outer section. The seal assembly may include one or more excluder features. A rubber casing is molded about portions of the carrier. Preferably, one or more annular undulations are formed in a coining operation during the rubber molding process.

11 Claims, 6 Drawing Sheets

HYDRODYNAMIC SEAL WITH INCREASED FLEXIBILITY SEALING ELEMENT

BACKGROUND OF THE INVENTION

1. Field of the Invention

This invention relates generally to hydrodynamic seals, and more particularly toward the formation of a sealing element having improved flexibility.

2. Related Art

Hydrodynamic seals are used frequently as an interface between a housing and a rotating shaft where it extends through the housing to contain oil, water or other fluids against leakage. These types of seals are sometimes referred to as radial shaft seals. Common applications for hydrodynamic seals include engine crankshafts, transmission shafts, as well as a variety of industrial applications.

Hydrodynamic seals typically include an elastomeric member in direct contact with the rotating shaft. In some varieties of radial shaft seal, this elastomeric member is made from polytetrafluoroethylene (PTFE) type material. Of course, other suitable alternative materials may exist. The PTFE elastomeric sealing member is designed to deform in use so as to enhance the likelihood that the seal will stay in continuous, intimate contact with the rotating shaft despite any lack of concentricity between the rotating shaft and the seal's carrier structure.

Many examples of hydrodynamic seals with PTFE sealing members are shown in the art. For example, U.S. Pat. No. 6,168,164 to Toth et al., issued Jan. 2, 2001 describes a hydrodynamic seal with a PTFE element that includes specially formed hydrodynamic grooves. The entire disclosure of U.S. Pat. No. 6,168,164 is hereby incorporated by reference and relied upon. Another example of a prior art hydrodynamic seal may be found in U.S. Pat. No. 7,100,924 to Toth et al., issued Sep. 5, 2006. The entire disclosure of U.S. Pat. No. 7,100,924 is hereby incorporated by reference and relied upon. The '924 patent describes a PTFE hydrodynamic sealing element which, in one embodiment, includes an integrally formed living hinge portion for enhanced sealing element flexibility. This reference describes the long felt need for seal flexibility in these applications. A further example is shown in U.S. Pat. No. 6,336,638 in which a continuous open groove spiral is coined into both a common thickness mid-portion and inner region seal element.

While the hydrodynamic seal constructions shown in at least some of the above noted patents have been commercially successful, there remains a continuous desire to improve the seal construction so that it functions even more efficiently. Three areas of particular concern for improvement relate to the flexibility of the sealing element, dirt exclusion, and air leak testing. In some applications of hydrodynamic seals, for example in engine crankshaft applications, a newly assembled engine is leak-checked using air pressure as a quality control measure. While hydrodynamic seals according to the prior art designs like those described above function well in service, they are not always well-suited to these newer leak-checking methods in which an engine block is pressurized with air. The large open groove of some prior art hydrodynamic seals are not well suited to these newer leak checking methods. The large open groove of the seal element has been identified as contributing to the cause for leak-check failure. Accordingly, there is a need to provide an improved hydrodynamic seal which functions well in normal operations and is also suitable to holding pressurized air in an engine block, for example, during leak-checking procedures. Also, seal elements with continuous large open groove spirals like that shown in U.S. Pat. No. 6,336,638 have a problem with the suction of external dirt and dust being pulled under the sealing lip interface at the shaft, allowing dirt to pass into the oil chamber and wear the shaft.

SUMMARY OF THE INVENTION

A hydrodynamic shaft seal assembly is provided of the type for surrounding a rotating shaft to arrest the movement of fluids from one side of the seal to the other. The assembly comprises a generally annular carrier and an annular seal member mounted on the carrier. This seal member extends radially inwardly from the carrier in a free state condition. The seal member has an outer section adjacent the carrier, and inner section, and a mid-portion between the inner and outer sections. The outer section may be bonded to the carrier via an intermediate rubber layer or in direct contact with the carrier for fixed anchoring of the seal thereto. The inner section of the seal member establishes a dynamic sealing surface for directly engaging a rotating shaft in surface-to-surface contact. The sealing surface has at least one small, preferably closed, hydrodynamic groove terminating adjacent the mid-portion of the seal member. The seal member includes at least one annular undulation formed in the mid-portion thereof and configured to increase the flexibility of the seal member relative to the radially outward section.

The annular undulation formed in the mid-portion of the seal member provides improved flexibility in an intermediate region of the element, thereby improving its sealing effectiveness, without extending into the inner region of the sealing element where it contacts the shaft. As a result, the suction effect on externally present dust or dirt is minimized.

According to another aspect of this invention, a method is provided for manufacturing a hydrodynamic shaft seal assembly. The steps include shaping a generally annular carrier and forming an annular seal member. The seal member includes an outer section having a thickness, an inner section having a thickness, and a mid-portion disposed between the inner and outer sections. The forming step further includes cutting a spiral hydrodynamic groove in the inner section of the seal member. The outer section of the seal member is mounted in the carrier. The forming step also includes thinning the mid-portion in a machining operation to a thickness less than the respective thicknesses of the inner and outer portions, and then coining at least one annular undulation in the mid-portion to increase the flexibility of the seal member.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
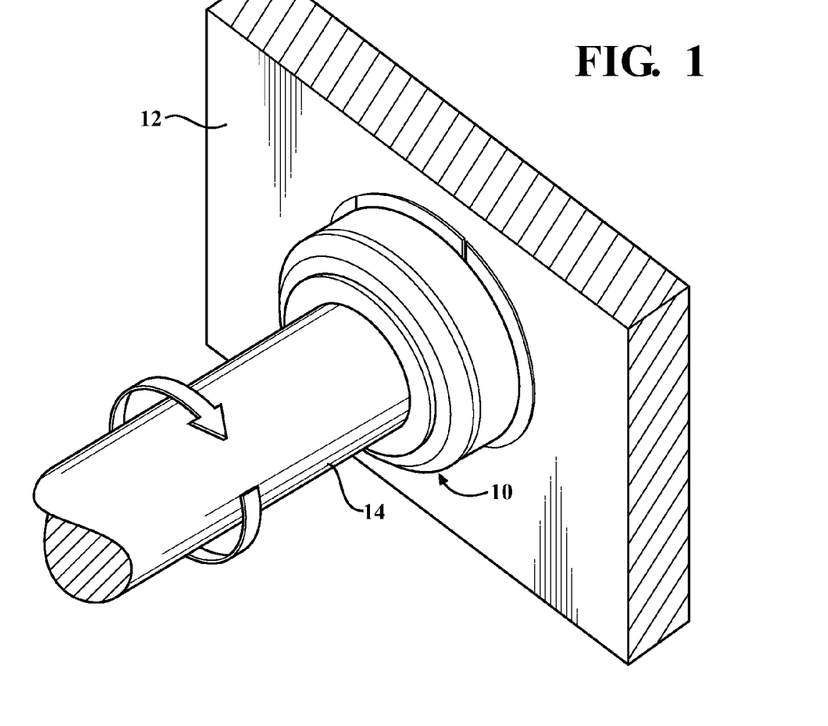
FIG. 1 is a perspective view of a rotating shaft supported in a housing and including a hydrodynamic shaft seal according to the subject invention.
Figure 2:
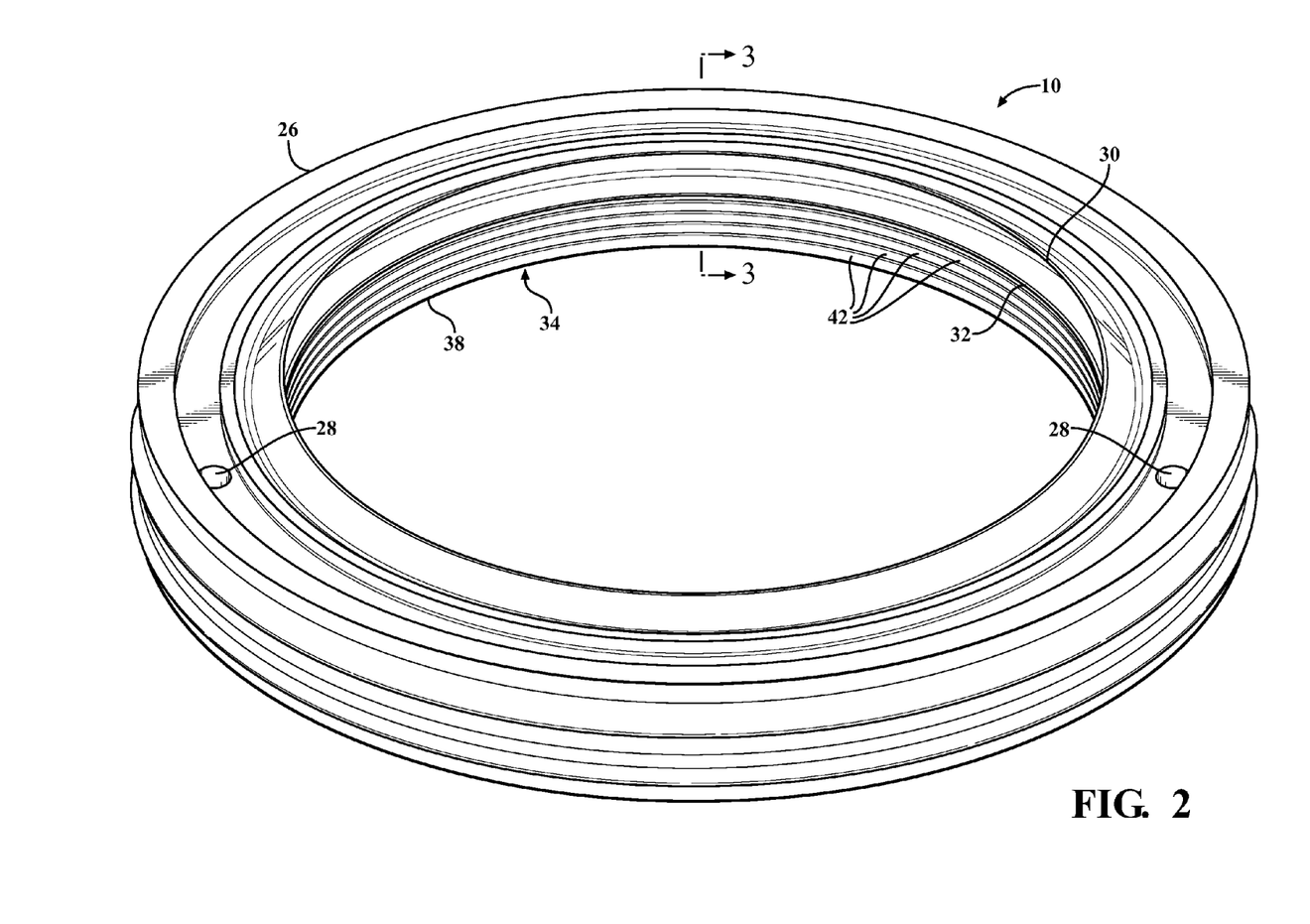
FIG. 2 is a perspective view of a hydrodynamic seal according to the subject invention.
Figure 3:
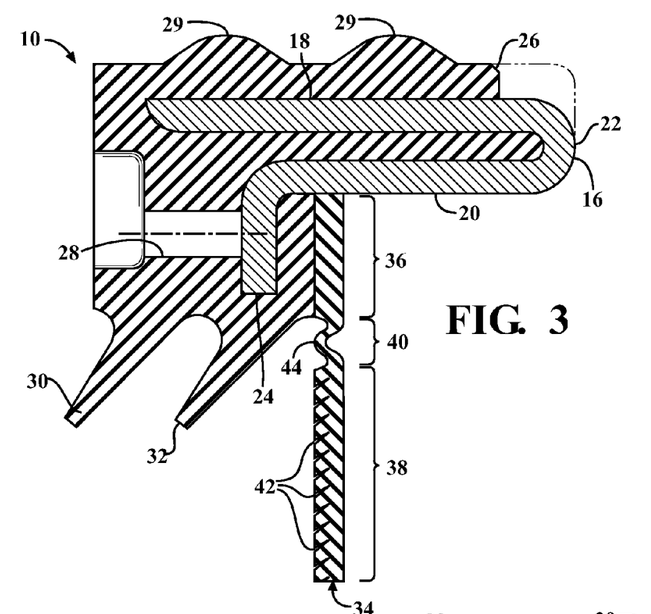
FIG. 3 is a cross-sectional view taken generally along lines 3-3 of FIG. 2.

Referring to the figures, wherein like numerals indicate like or corresponding parts throughout the several views, a hydrodynamic shaft seal assembly according to one embodiment of this invention is generally shown at 10 in FIGS. 1-3. In FIG. 1, the shaft seal assembly 10 is shown mounted in an exemplary housing 12 such as may, for example, comprise an engine crank case, a transmission, or other machine component. A rotating shaft 14 passes through the housing 12 and center of the shaft seal assembly 10. The purpose of the hydrodynamic shaft seal 10 is to arrest the migration of fluids, such as oils, grease, water or the like from one side of the seal 10 to the other. In this way, the shaft seal 10 may effectively contain lubricants inside the housing 12 while simultaneously excluding dust and other debris from entering the housing 12.

Figure 10:
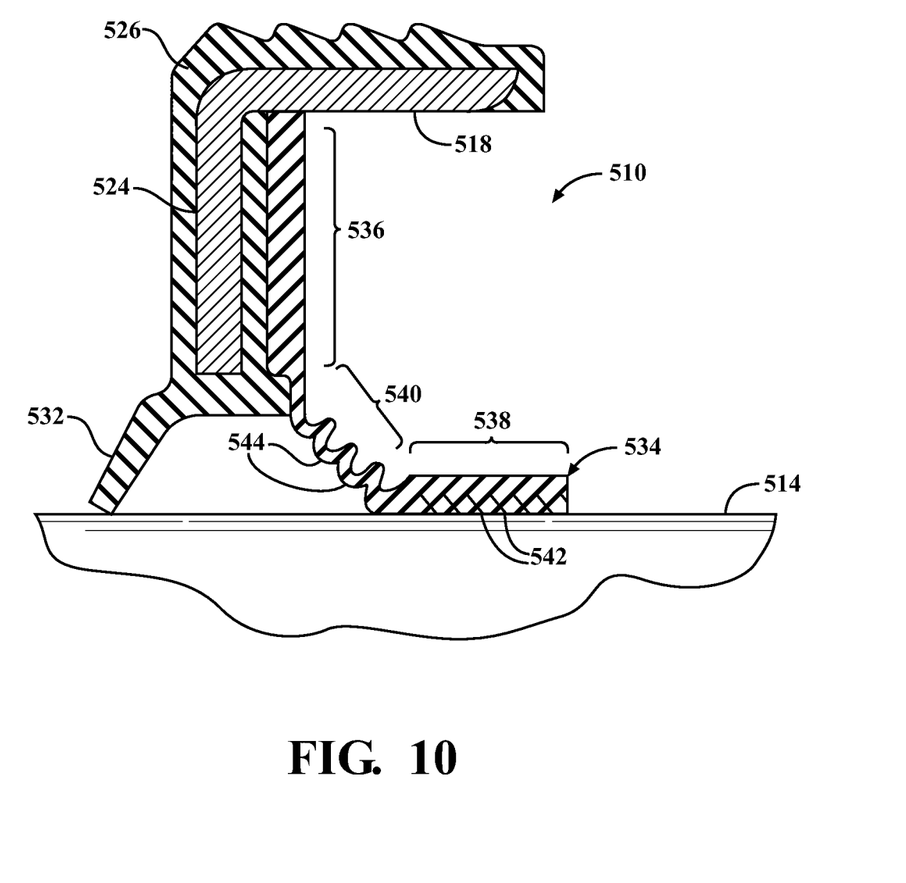
FIG. 10 is a cross-sectional view of a fifth alternative embodiment of the invention.

FIG. 2 shows the seal assembly 10 as a generally annular member. FIG. 3 is a cross-section through the seal assembly 10 taken generally along line 3-3 in FIG. 2. Referring specifically to FIG. 3, the seal assembly 10 is shown including a generally annular carrier 16 which, in one embodiment, is fabricated from a rigid, metallic material such as steel. The carrier 16 includes an annular outer wall 18 and an annular inner wall 20. The inner wall 20 is arranged concentric with respect to the outer wall 18. The two walls 18, 20 are joined together by an annular bridge portion 22. As shown in FIG. 10, the inner and outer walls can be integrated into a single wall feature, as described below. The carrier 16 may further include an annular flange 24 that extends radially inwardly from the inner wall 20.

The carrier 16 is preferably enveloped in a rubber casing 26 that extends around the majority of the outer wall 18 and fills the space between inner 20 and outer 18 walls. The rubber casing 26 may also substantially fully envelop the flange 24. Rubber to metal bonding, and in this case bonding of the casing 26 to the carrier 16, is a process by which the rubber is mechanically and/or chemically affixed to the metal carrier 16 during the molding process. During this process, after the carrier 16 is appropriately degreased and any necessary adhesives applied, the metallic carrier 16 is inserted into a mold cavity and suspended therein using chaplet pins (not shown) so that rubber flows around the metal parts. Voids 28 appear in the locations where chaplet pins were used during the molding process. The seal assembly 10 preferably includes an excluder member extending radially inwardly from the carrier 16. In this embodiment, the excluder member comprises a pair of cantilevered rubber lips 30, 32 integrally formed from the same rubber used to form the casing 26. These excluder lips 30, 32 help prevent dust and other contaminants from passing through the housing 12 and thereby potentially contaminating lubricants or other liquids on the other side of the seal assembly 10. The excluder feature 30, 32 is preferably, although not necessarily, proximate to and supported by the flange 24 of the carrier 16. Friction-enhancing ribs 29 may, optionally, be formed in the portion of the casing 26 surrounding the outermost side of the outer wall 18 to increase grip with the housing 12.

Figure 4:
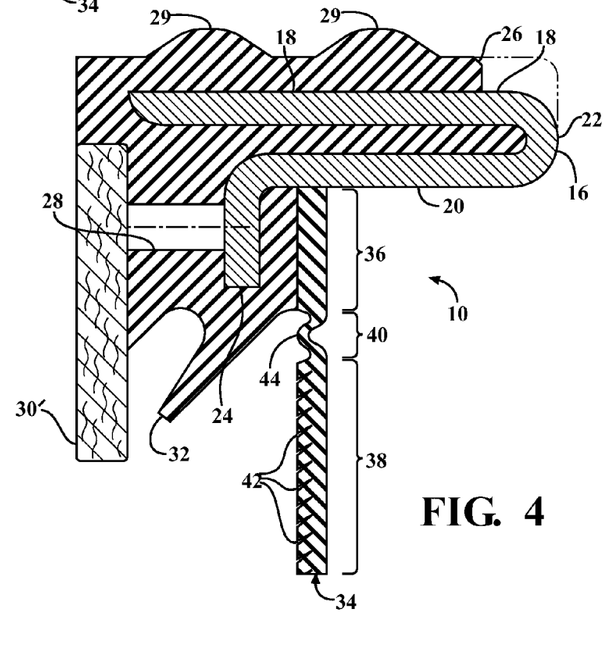
FIG. 4 is a cross-sectional view as in FIG. 3 but showing an alternative embodiment wherein the excluder member includes a felt or foam element.

FIG. 4 illustrates a slight variation of the seal assembly 10 shown in FIG. 3 wherein one excluder lip 30 is replaced with a felt or foam type excluder member 30'. This may be desired in applications where more aggressive dust exclusion is required.

The shaft seal assembly 10 further includes an annular seal member generally indicated at 34. In the preferred embodiment, the seal member 34 is in the form of a plate or wafer made of a polymer material, and preferably a polytetrafluoroethylene (PTFE) compound which may be cut from a tubular billet. Fillers may be added to the wafer material to specifically adapt the seal for its intended use. Suitable filler materials could include glass fibers, molybdenum disulfide, graphite and bronze. Other compositions for the seal member 34 may be used depending upon the application.

As shown in FIGS. 2 and 3, the annular seal member 34 may extend radially inwardly from the carrier 16 in a free state condition. An outer section 36 of the seal member 34 is disposed adjacent the carrier. An inner section 38 of the seal member 34 occupies the radially inwardmost regions of the seal member 34 and is adapted for direct surface-to-surface contact with the rotating shaft 14. A mid-portion 40 of the seal member 34 is disposed between the inner 38 and outer 36 sections. As best shown in FIG. 3, the outer section 36 is directly anchored to the carrier 16 via bonding to the rubber casing 26. However, those of skill in the art may appreciate non-bonded arrangements wherein the seal member 34 is clamped mechanically to the carrier 16.

The inner section 38 includes at least one hydrodynamic aid to direct oil or other contained liquid in a desired direction. The hydrodynamic aid is preferably of the closed type represented by grooves or channels 42 cut in a spiral pattern similar to that described in the above-noted U.S. Pat. Nos. 6,168,164 and 7,100,924. The hydrodynamic groove 42 terminates adjacent the mid-portion 40 of the seal member 34.

The mid-portion 40 of the seal member 34 is preferably thinned in a machining operation so that its resulting thickness is less than that of the inner 38 and outer 36 sections. In other words, when the wafer is initially cut from the billet of PTFE material as described above, a groove is machined into the face of the mid-portion 40 of the billet to produce a reduced thickness through use of a cutting tool. Following this, at least one annular undulation 44 is formed in the thinned mid-portion 40 so as to increase the flexibility and reduce the bending force of the seal member 34, and in particular the bending of the inner section 38 relative to the outer section 36. When multiple undulations are specified, these are arranged concentrically with one another. The one or more undulations 44 are preferably formed in a coining operation during the rubber molding process, although other manufacturing techniques may be employed to create this characteristic feature. The one or more annular undulations 44, in combination with its thinned section, create a highly flexible mid-portion 40 of the seal member 34 with correspondingly improved sealing capabilities, including in applications where reduced shaft loads are desired between the seal and shaft. A seal member 34 which includes the combined machined and coined mid-portion 40 also increases the ability of the seal assembly 10 to respond to shaft 14 dynamic runout and static bore-to-shaft misalignment conditions in an improved manner. The coined undulation 44 may be formed when the seal member 34 is still in a loose-piece state, or while the sealing element 34 is being bonded to the casing 16, or in a subsequent operation.

The at least one undulation 44, as shown in FIG. 3, includes a convex distortion and a complimentary concave distortion on opposite sides of the seal member 34. In the illustrated embodiment, when only one undulation 44 is used, the convex distortion and the hydrodynamic groove 42 are disposed on the same side of the sealing member to enhance bending capability.

Figure 5:
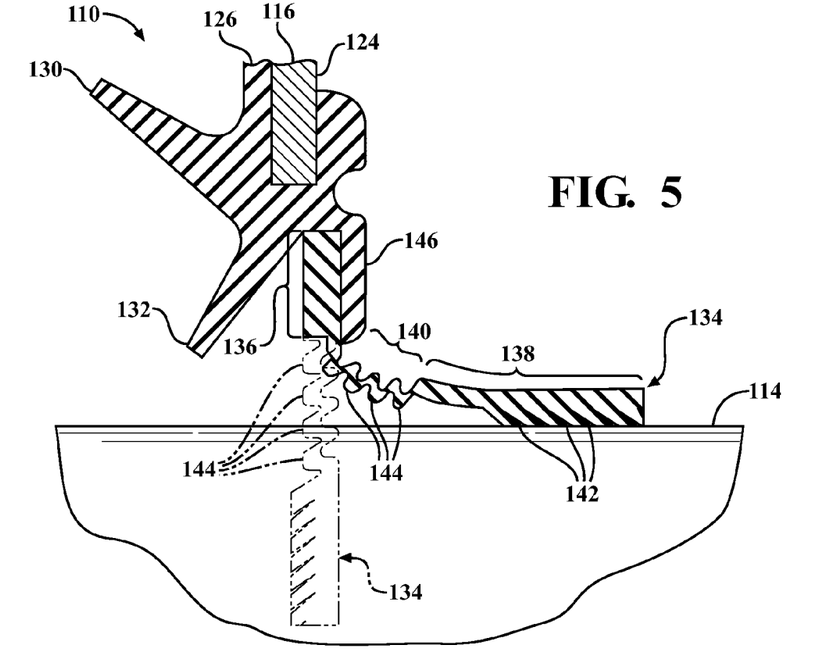
FIG. 5 is a cross-sectional view of a hydrodynamic seal according to a first alternative embodiment of the invention and shown formed onto a shaft.

FIG. 5 describes a first alternative embodiment of the subject invention in which like or corresponding parts are identified with similar reference numbers offset by 100. In this example, the seal member 134 includes a plurality of concentric annular undulations 144 in the mid-portion 140. Another variation in this embodiment may be seen in the attachment configuration for the seal member 134 relative to the carrier 116. In this example, the seal member 134 is attached using a section of elastomer 146 that acts as a hinge relative to the carrier 116. The section of elastomer 146 is an integral portion of the rubber casing 126. Furthermore, the excluder lip 130 is arranged to contact a vertical face (not shown) in an axial direction.

Figure 6:
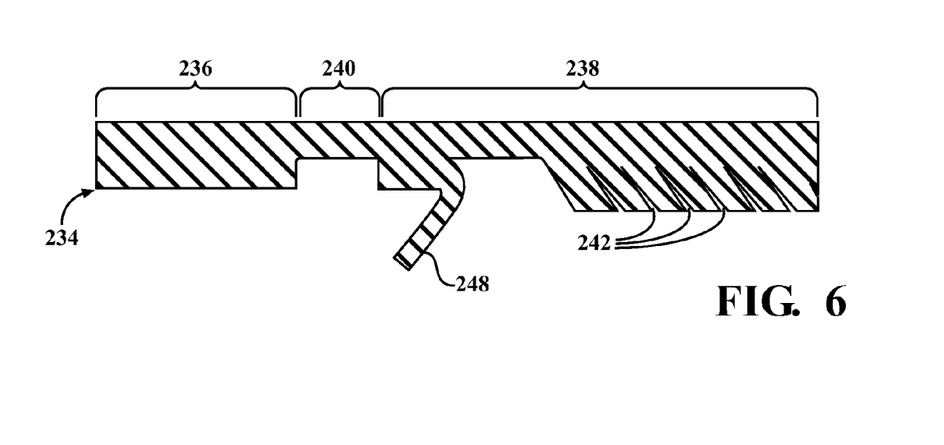
FIG. 6 is an enlarged cross-sectional view of a sealing element, partially formed, according to a second alternative embodiment of the invention.
Figure 7:
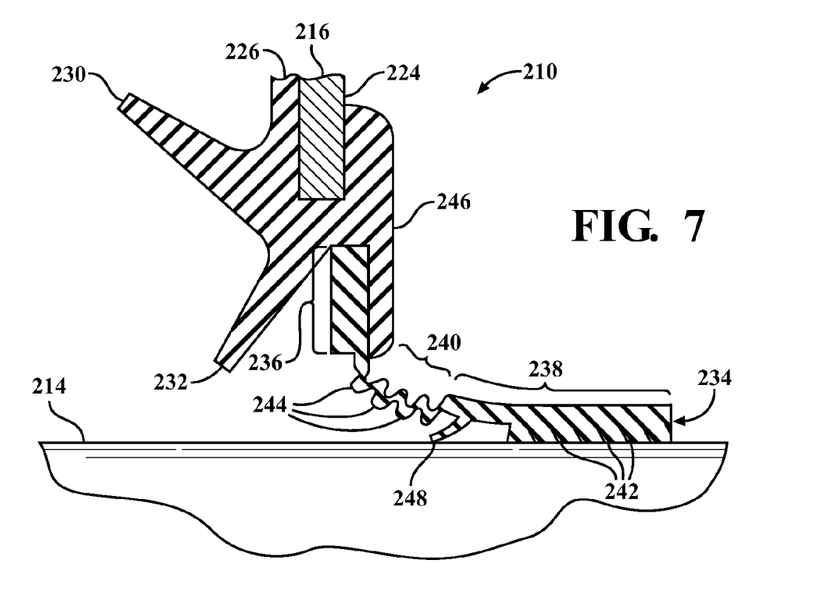
FIG. 7 is a cross-sectional view of a hydrodynamic shaft seal assembly disposed for operation together with a rotating shaft and incorporating the second alternative sealing element of FIG. 6 but showing the sealing element fully formed.

A second alternative embodiment is shown in FIGS. 6 and 7, wherein like or corresponding parts are identified with similar reference numerals offset by 200. The second alternative embodiment of the seal assembly 210 is similar to the first alternative embodiment 110 shown in FIG. 5, except that the seal member 234 in this case is formed with an integral dust flap 248. This dust flap 248 is disposed between the hydrodynamic groove 242 and the mid-portion 240. FIG. 6 illustrates the seal member 234 in an intermediate state after the mid-portion 240 has been thinned but before formation of the annular undulations 244.

Figure 8:
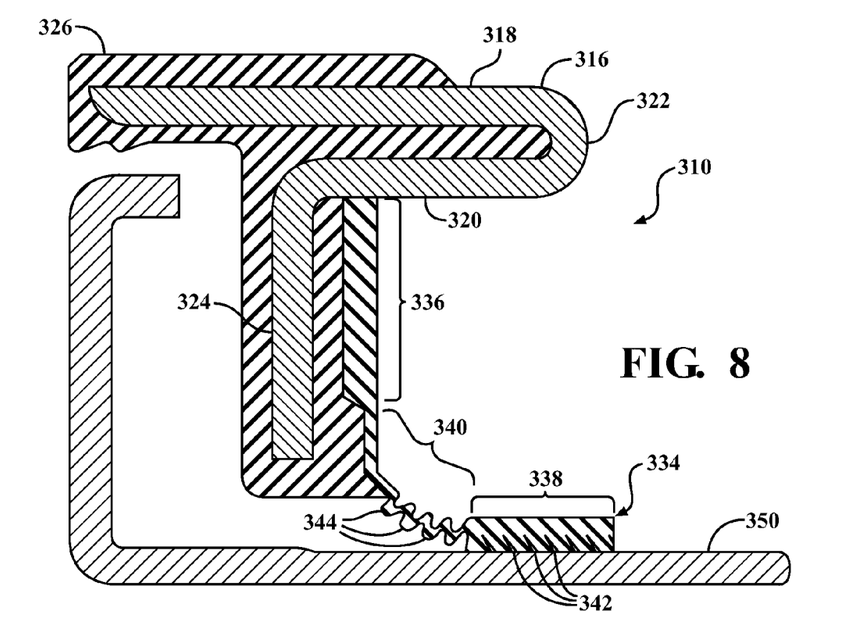
FIG. 8 is a cross-sectional view of a portion of a hydrodynamic shaft seal assembly according to a third alternative embodiment depicting the primary PTFE element in direct contact with an optional wear sleeve and bonded to an inside face of the metal carrier.
Figure 9:
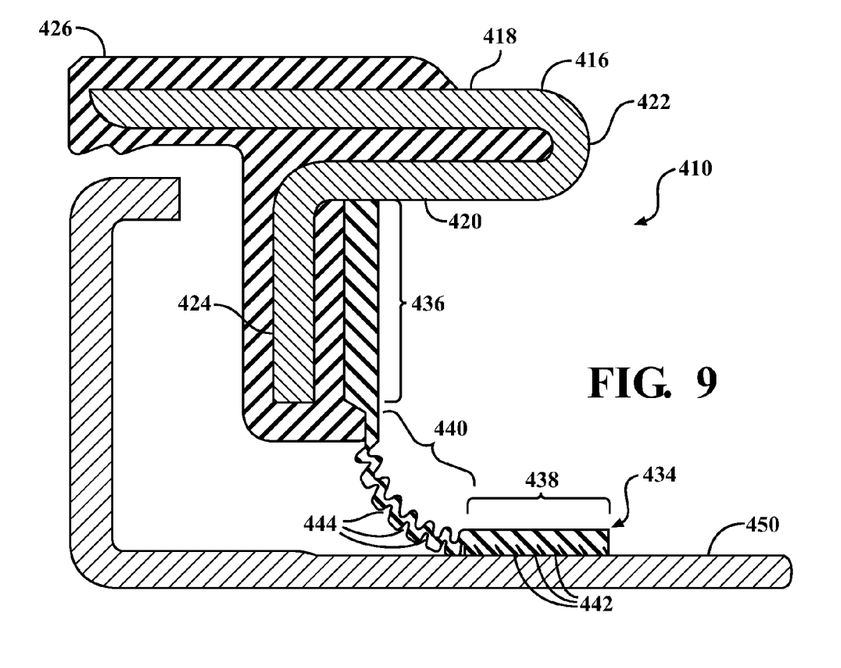
FIG. 9 is a cross-sectional view showing a fourth alternative embodiment of the subject invention.

FIG. 8 depicts a third alternative embodiment of the subject invention, wherein like or corresponding parts are described with reference numerals offset by 300. In this example, a wear sleeve 350 is shown, and is of the type commonly used when the running surface of the shaft (not shown) may be of questionable surface finish. A fourth alternative embodiment of the seal assembly is shown in FIG. 9. Like or corresponding parts are identified with consistent reference numerals offset by 400. The embodiments illustrated in FIGS. 8 and 9 can be compared to one another as examples of variability that may be engineered into the location and number of undulations 344, 444 as a means of adjusting the seal flexibility as well as relative location to the wear sleeve 350, 450 (or relative to the rotating shaft in cases where no wear sleeve is used). The particular position where the overmolded rubber casing 326, 426 contacts the seal member 334, 434, and more specifically where it terminates relative to the mid-portion 340, 440, can be varied according to application and desired operating characteristics.

FIG. 10 shows yet another, fifth alternative embodiment of the invention. As in preceding examples, in this fifth embodiment like or corresponding features are indicated with like reference numbers offset by 500. Here, the carrier walls are integrated into a single annular outer wall 518 thus omitting the previously described inner wall and bridge features. The annular flange 524 extends directly from the outer wall 518. This example illustrates but one way in which the carrier construction can be varied without departing from the spirit of this invention. The seal member 534 functions in this context substantially identical to the seal member described in the preceding examples. Those of skill in this art will appreciate that elements and features of the various embodiments can be mixed and matched to create new designs.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A hydrodynamic shaft seal assembly comprising:
   a carrier; said carrier being formed of a rigid, metallic material; said carrier having a generally annular configuration; said carrier including an annular outer wall; said carrier including an annular flange extending radially inwardly relative to said outer wall; said carrier including a rubber casing enveloping at least a portion of said outer wall and said annular flange;
   at least one excluder member extending radially inwardly from said carrier; said excluder member having at least one cantilevered rubber lip; said excluder member directly contacting said annular flange of said carrier;
   an annular PTFE seal member mounted on said carrier and extending radially inwardly therefrom in a free-state condition; said seal member having an outer section adjacent said carrier, an inner section, and a mid portion disposed between said inner and outer sections; said outer section in direct bonded engagement to said rubber casing of said carrier; said inner section being flexible for establishing a dynamic sealing surface with a rotating shaft in surface-to-surface contact therewith; said sealing surface having at least one cut-in spiral hydrodynamic groove terminating adjacent said mid portion of said PTFE seal member; and
   said PTFE seal member including at least one coined-in annular undulation formed in said mid portion thereof; said undulation having complimentary concave and convex distortions; said mid portion of said sealing member having a thickness less than the thickness of said inner and outer sections.

2. The shaft seal assembly of claim 1 wherein said mid portion of said sealing member has a thickness less than the thickness of said inner and outer sections.

3. The shaft seal assembly of claim 1 wherein said mid portion of said seal member is thinned in a machining operation and said at least one undulation is formed in a subsequent coining operation.

4. The shaft seal assembly of claim 1 wherein said convex distortion and said hydrodynamic groove are disposed on a common side of said sealing member.

5. The shaft seal assembly of claim 1 wherein said at least one undulation comprises a plurality of concentrically arranged annular undulations.

6. The shaft seal assembly of claim 1 wherein said hydrodynamic groove is machine-formed by spirally slitting said sealing surface.

7. The shaft seal assembly of claim 1 wherein said seal member is fabricated from a filled PTFE material.

8. The shaft seal assembly of claim 1 wherein said seal member includes an integral dust flap disposed between said hydrodynamic groove and said at least one undulation.

9. The shaft seal assembly of claim 1 wherein said carrier includes an annular inner wall arranged concentric with said outer wall, and an annular bridge portion joining said outer and inner walls.

10. The shaft seal assembly of claim 1 wherein said outer section of said seal member is directly bonded to said rubber casing of said carrier.

11. The shaft seal assembly of claim 1 wherein said excluder member includes an annular non-rubber element disposed adjacent said rubber lip.

* * * * *